US010781872B2

(12) United States Patent
Jedele et al.

(10) Patent No.: US 10,781,872 B2
(45) Date of Patent: Sep. 22, 2020

(54) FLOATING COLLAR AND ONE-PIECE GUIDE PIN AND BOLT ASSEMBLY

(71) Applicant: Akebono Brake Industry Co., Ltd., Tokyo (JP)

(72) Inventors: Philip Nathanael Jedele, Ypsilanti, MI (US); Michio Suzuki, Walled Lake, MI (US)

(73) Assignee: AKEBONO BRAKE INDUSTRY CO., LTD., Chuo-Ku, Tokyo (JP)

( * ) Notice: Subject to any disclaimer, the term of this patent is extended or adjusted under 35 U.S.C. 154(b) by 0 days.

(21) Appl. No.: 16/170,405

(22) Filed: Oct. 25, 2018

(65) Prior Publication Data

US 2020/0132142 A1 Apr. 30, 2020

(51) Int. Cl.
*F16D 65/14* (2006.01)
*F16D 65/00* (2006.01)
*F16D 55/227* (2006.01)
*F16D 55/2265* (2006.01)
*F16D 55/00* (2006.01)

(52) U.S. Cl.
CPC ....... *F16D 65/0087* (2013.01); *F16D 55/227* (2013.01); *F16D 55/22655* (2013.01); *F16D 65/0056* (2013.01); *F16D 65/0068* (2013.01); *F16D 65/0093* (2013.01); *F16D 2055/0008* (2013.01); *F16D 2055/0016* (2013.01); *F16D 2250/0084* (2013.01)

(58) Field of Classification Search
CPC ..... F16D 55/22655; F16D 65/09; F16D 65/14
USPC ........................................... 188/73.44, 73.45
See application file for complete search history.

(56) References Cited

U.S. PATENT DOCUMENTS

| 4,031,986 | A |   | 6/1977  | Thompson |
|-----------|---|---|---------|----------|
| 4,311,219 | A | * | 1/1982  | Watanabe ......... F16D 55/22655 |
|           |   |   |         | 188/196 P |
| 4,401,194 | A | * | 8/1983  | Klassen ............ F16D 55/22655 |
|           |   |   |         | 188/73.44 |
| 4,574,922 | A |   | 3/1986  | Varin et al. |
| 4,926,979 | A |   | 5/1990  | Odaka |
| 4,964,490 | A |   | 10/1990 | Watanabe |
| 5,464,077 | A |   | 11/1995 | Thiel |
| 5,526,904 | A | * | 6/1996  | Walden ............. F16D 55/22655 |
|           |   |   |         | 188/73.44 |
| 5,562,187 | A |   | 10/1996 | Tribuzio et al. |
| 5,860,496 | A |   | 1/1999  | Kullman et al. |
| 6,026,938 | A |   | 2/2000  | Demoise, Jr. et al. |
| 6,131,706 | A |   | 10/2000 | Gotti |
| D433,621  | S | * | 11/2000 | Wiley ............................ D8/387 |
| D438,494  | S |   | 3/2001  | Charmat et al. |
| 6,272,914 | B1 |  | 8/2001  | Ciotti |

(Continued)

OTHER PUBLICATIONS

U..S Non-Final Office Action dated Jul. 1, 2020, U.S. Appl. No. 16/369,799.

*Primary Examiner* — Christopher P Schwartz
(74) *Attorney, Agent, or Firm* — The Dobrusin Law Firm, P.C.; Bryan S. Lemanski

(57) ABSTRACT

A guide pin assembly, comprising: (a) a sleeve; and (b) a guide pin comprising: (i) a head portion; and (ii) a shaft portion integrally formed with the head portion and extending through a hole of the sleeve, wherein an engaging portion of the shaft portion engages an internal surface of the sleeve, and the sleeve and the guide pin are substantially coaxial; and wherein the guide pin assembly is configured to be inserted in a borehole of a brake caliper.

20 Claims, 4 Drawing Sheets

(56) References Cited

U.S. PATENT DOCUMENTS

| | | | |
|---|---|---|---|
| D502,130 S | | 2/2005 | Demoise, Jr. |
| 7,234,568 B2 | | 6/2007 | Schorn |
| 8,051,958 B1 | * | 11/2011 | Rockwell .......... F16D 55/22655 |
| | | | 188/73.45 |
| 8,251,188 B2 | * | 8/2012 | Teper ................ F16D 55/22655 |
| | | | 188/73.39 |
| 9,394,954 B2 | | 7/2016 | Smith et al. |
| 9,551,387 B2 | | 1/2017 | Smith et al. |
| 10,054,175 B2 | | 8/2018 | Kula et al. |
| 2007/0051568 A1 | | 3/2007 | Barbosa et al. |
| 2008/0029356 A1 | | 2/2008 | Halasy-Wimmer et al. |
| 2008/0093181 A1 | | 4/2008 | Waag et al. |
| 2013/0199879 A1 | | 8/2013 | Thompson et al. |
| 2014/0116817 A1 | * | 5/2014 | Morais ................ F16D 55/2265 |
| | | | 188/73.45 |

* cited by examiner

FLOATING COLLAR AND ONE-PIECE GUIDE PIN AND BOLT ASSEMBLY

FIELD

The present teachings generally relate to a brake system, and more particularly, to a floating collar and one-piece guide pin and bolt assembly for a brake caliper assembly.

BACKGROUND

A brake system may frequently be used to decelerate a vehicle, such as an automobile, motorcycle, or airplane. The brake system may perform a brake apply to the vehicle by moving one or more brake pads into contact with a rotating brake rotor to create a clamping force. The clamping force in turn functions to decelerate the vehicle.

The brake pads may move substantially axially along the axis of rotation of the brake rotor to apply and release the clamping force. Frequently, the brake pads may be guided along one or more abutment features, such as a support bracket, to help maintain the substantially axial movement. The brake pads may be affixed to a caliper housing of the brake system so that the caliper housing axially moves the brake pads along the guide pins to provide and release a clamping force on the brake rotor. As the caliper housing continuously moves the brake pads between clamping and releasing over a lifetime of the brake system, the guide pins may misalign and prevent proper movement of the caliper housing, and thus, the brake pads.

The guide pins may frequently include a bolt portion so that the guide pins may be mounted to holes of the caliper housing and then inserted into one or more cavities of the support bracket so that the caliper housing movably opposes the support bracket. However, proper alignment of the guide pin during mounting to the caliper housing may be difficult due to manufacturing tolerances on the caliper housing, the support bracket, or both, and from the bolt portion being integrated into the guide pins. A common alternative is to have the bolt and guide pin as separate components, enlarged mounting holes in the caliper housing, or both so that the guide pin may be aligned during threading of the bolt through the caliper housing and into the guide pin. Additionally, a two-piece guide pin design may also require additional packaging space to accommodate an internal threading on the guide pin to receive the bolt, resulting in a greater distance between the caliper housing and the support. This increased distance may result in interference between components of the brake system and additional components of the vehicle, such as suspension components.

Examples of brake systems having one or more guide pins are disclosed in U.S. Pat. Nos. 4,401,194, 4,574,922, 4,926, 979, 4,964,490, 5,562,187, 5,860,496, 6,026,938, 8,051,958, 8,251,188, 9,394,954, 9,551,387, 10,054,175, D433,621, D438,494, and D502,130; and U.S. Patent Publication Nos. 2007/0051568, 2008/0029356, 2008/0093181, 2013/0199879, and 2014/0116817, all of which are incorporated by reference herein for all purposes. It would be attractive to have a brake system in which guide pins maintain proper alignment during the assembly process. What is needed is a brake system having guide pins that are properly aligned during assembly and maintain the alignment during operation of the brake system. It would be attractive to have a guide pin assembly that minimizes misalignments of the guide pins relative to a caliper housing, a support bracket, or both and prevents lockup issues between the caliper housing and the support bracket. What is needed is a guide pin assembly that mounts to the caliper housing in a manner that aligns with one or more cavities of the support bracket. It would be attractive to have a guide pin assembly that minimizes the distance between the caliper housing and the support bracket required by the guide pin assembly. What is needed is a guide pin assembly having smaller packaging dimensions.

SUMMARY

The present teachings meet one or more of the present needs be providing: a guide pin assembly, comprising: (a) a sleeve; and (b) a guide pin comprising: (i) a head portion; and (ii) a shaft portion integrally formed with the head portion and extending through a hole of the sleeve, wherein an engaging portion of the shaft portion engages an internal surface of the sleeve, and the sleeve and the guide pin are substantially coaxial; and wherein the guide pin assembly is configured to be inserted in a borehole of a brake caliper.

The present teachings meet one or more of the present needs by providing: a brake caliper comprising: (a) a support bracket; (b) a caliper housing, the caliper housing being movably engaged to the support bracket; and (c) a first brake pad assembly and an opposing second brake pad assembly positioned within the caliper housing, the first and second brake pad assemblies secured to the support bracket, wherein the first and second brake pad assemblies are movably engaged to each other via one or more guide pin assemblies that are fixedly secured to the caliper housing and extend into one or more cavities of the support bracket.

The present teachings meet one or more of the present needs by providing: a guide pin assembly comprising: (a) a sleeve having a flange; (b) a guide pin comprising: (i) a shaft portion; and (ii) a head portion integrally formed with the shaft portion, the head portion having a flange near an end connecting the head portion and the shaft portion, wherein the flange of the head portion abuts a peripheral edge of the sleeve and an external surface of the shaft portion engages an internal surface of the sleeve; and wherein the guide pin assembly is configured to be inserted in a brake caliper.

The present teachings meet one or more of the present needs by providing a method comprising: (a) inserting the sleeve of one of the guide pin assemblies into a hole of a caliper housing until a flange of the sleeve abuts an inner surface of the caliper housing; (b) inserting the shaft portion of the guide pin into the hole of the sleeve so that the shaft portion extends through a boot positioned between the inner surface of the caliper housing and a support bracket, and further extends into a cavity of the support bracket; and (c) engaging the engaging portion of the shaft portion with the internal surface of the sleeve to fixedly secure the guide pin with the sleeve, wherein a flange of the guide pin abuts an outer surface of the caliper housing after engagement.

The present teachings provide: a brake system having guide pins that maintain proper alignment during the assembly process; a brake system having guide pins that are properly aligned during assembly and maintain the alignment during operation of the brake system; a guide pin assembly that minimizes misalignments of the guide pins relative to a caliper housing, a support bracket, or both and prevents lockup issues between the caliper housing and the support bracket; a guide pin assembly that mounts to the caliper housing in a manner that aligns with one or more cavities of the support bracket; a guide pin assembly that minimizes the distance between the caliper housing and the support bracket required by the guide pin assembly; and a guide pin assembly having smaller packaging dimensions.

DETAILED DESCRIPTION

Figure 1:
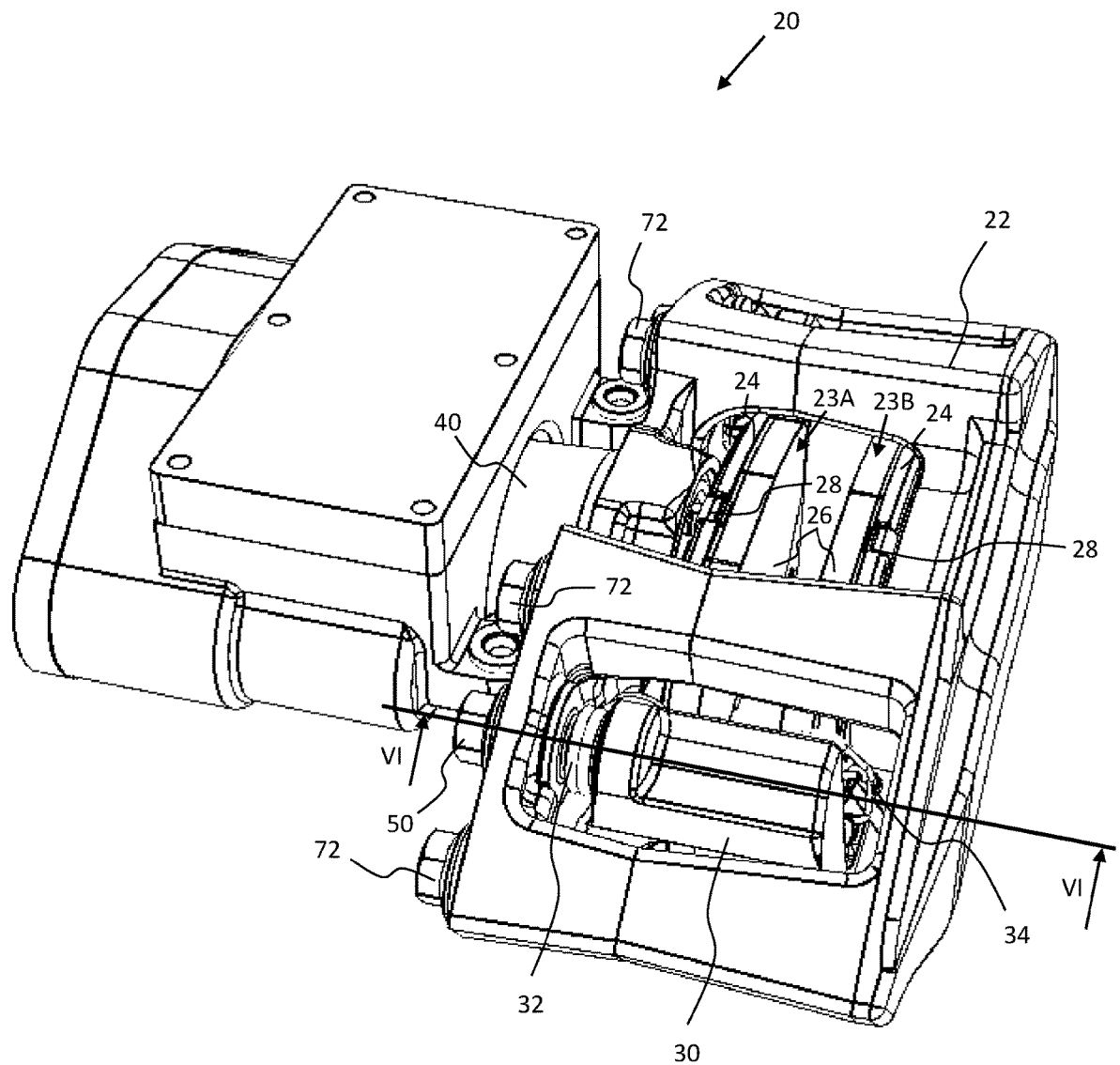
FIG. 1 is a perspective view of a brake assembly having a plurality of guide pin assemblies.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the description herein, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The teachings herein relate to a brake assembly configured to decelerate a vehicle, such as a car, truck, bus, train, airplane, or a combination thereof. The brake assembly may also be integrated into components used for manufacturing or other equipment that require a brake for deceleration of one or more components, such as a lathe, amusement park rides, wind turbines, metal stamping presses, conveyor systems, or a combination thereof. The brake assembly may include one or more stationary components and/or one or more moving components. The one or more stationary components may include a support bracket, a caliper housing, one or more mounting features, one or more brake pad assemblies, one or more abutment features, or a combination thereof. The one or more moving components may include the caliper housing, one or more clips, one or more springs, one or more guide pins, one or more brake pads, one or more pistons, or a combination thereof. The brake assembly may be positioned around a moving component so that one or more brake pad assemblies engage a surface of the moving component, causing the moving component to decelerate. For example, a caliper housing may receive a rotor within an opening of the caliper housing so that one or more brake pad assemblies located within the caliper housing axially move relative to the rotor provide a clamping force on opposing surfaces of the rotor. The brake assembly may include a leading end and a trailing end. The leading end may refer to an end where a point of the rotor passes through first during movement (i.e., the point of the rotor enters the brake assembly). Conversely, the trailing end may refer to an end where the point of the rotor passes through last during movement (i.e., after passing through the leading end when the rotor exits the brake assembly). The brake assembly may be in communication with a controller to electrically trigger activation (e.g., clamping) of the brake assembly. The brake assembly may be hydraulically activated by one or more hydraulic pressure lines. The brake assembly may include a caliper housing that is in communication with one or more brake pad assemblies.

The caliper housing may function to house one or more components of the brake assembly, such as one or more brake pad assemblies, abutment features, clips, springs, fasteners, or a combination thereof. The caliper housing may be in communication with the one or more components housed within the caliper housing. For example, the caliper housing may communicate with one or more brake pad assemblies to engage the one or more brake pad assemblies with a rotor of a vehicle. The caliper housing may include one or more pistons to drive one or more brake pad assemblies towards the rotor to create a clamping force. For example, the caliper may include an inboard piston and an outboard piston connected to an inboard and outboard brake pad assembly respectively for driving the brake pad assemblies towards the rotor (e.g., a fixed caliper). Alternatively, the caliper may include a single inboard piston to drive both an inboard brake pad assembly and an outboard brake pad assembly slidably engaged with the inboard brake pad assembly towards the rotor (e.g., a floating caliper having one or more guide pins). The caliper housing may include one or more openings so that a portion of the rotor is positioned within the confines of the caliper housing. For example, the caliper housing may include an opening along a bottom portion to receive a rotor so that opposing brake pad assemblies are positioned on opposing sides of the rotor. The caliper housing may include a bridge to connect opposing segments of the caliper housing (e.g., an inboard side and an outboard side). For example, an inboard side of the caliper housing having a first brake pad assembly may be integrally connected to an opposing outboard side of the caliper housing having a second brake pad assembly via the bridge. The caliper housing may include one or more mounting points to receive one or more clips, one or more springs, other components, or a combination thereof. The caliper housing may be configured to package one or more components of the brake assembly. The one or more components packaged within the caliper housing may include one or more brake pad assemblies, clips, springs, pistons, abutment features, guide pins, support brackets (e.g., brackets that support and/or mount the brake assembly to the vehicle), or a combination thereof. For example, the caliper housing may include one or more holes that receive one or more guide pins of the brake assembly so that the caliper housing movably opposes a support bracket. The one or more holes may extend through a thickness of a wall of the caliper housing so that the guide pins extend through the caliper housing to connect the caliper housing to a support bracket. The one or more holes may be any size and shape to receive the guide pins and align the guide pins with one or more cavities of the support brackets.

The profile of the caliper housing may be configured based on packaging requirements within the vehicle, packaging requirements of components located within the caliper housing, or both. The caliper housing may be any geometry and size to accommodate a given application. The caliper housing may vary in size, shape, or both for packaging within a desired vehicle. The caliper housing may be integrally formed, or may be a set of separate pieces joined together. For example, the caliper housing may be a pair of opposing pieces joined together via one or more fasteners, such as a bolt, screw, clip, pin, or a combination thereof. The caliper housing may include an interior contour substantially similar to one or more of the brake assembly components. For example, an interior surface of the caliper housing may be substantially similar to a shape of the one or more brake pad assemblies so that the caliper housing may receive the one or more brake pad assemblies.

The one or more brake pad assemblies may function to engage a rotor of the vehicle. The one or more brake pad assemblies may be configured to provide a clamping force on the rotor. The one or more brake pad assemblies may be in communication with the caliper housing or additional components to move the one or more brake pad assemblies. For example, the one or more brake pad assemblies may be in communication with one or more pistons located within the caliper housing to move the one or more brake pad assemblies towards the rotor, away from the rotor, or both. The one or more brake pad assemblies may move substantially axially relative to an axis of rotation of the rotor so that an engaging surface (e.g., a friction material) of the one or more brake pad assemblies is substantially parallel with a surface of the rotor, a rotor plane, or both. A plurality of one or more brake pad assemblies may be in communication to create a clamping force on the rotor. For example, a first brake pad assembly and an opposing second brake pad assembly may clamp opposing sides of the rotor to decelerate the vehicle. The first and second brake pad assemblies may move towards and away from the rotor. Alternatively, the first brake pad assembly may be stationary while the second brake pad assembly moves towards and away from the rotor, or vice versa (e.g., the caliper housing may be a fixed caliper housing or an opposed caliper housing). The one or more brake pad assemblies may include a friction material, a pressure plate, one or more abutment features, one or more springs, one or more clips, or a combination thereof.

A pair of opposing brake pad assemblies may be positioned on opposing sides of a rotor. For example, an inboard and an outboard brake pad assembly may maintain a gap between the brake pad assemblies when in a released position so that a portion of the rotor may be positioned within the gap. When the brake pad assemblies are applied (i.e., clamped), the gap between the brake pad assemblies decreases until the friction material of the brake pad assemblies contacts opposing sides of the rotor and creates a clamping force to decelerate the vehicle. When deceleration is complete, the opposing brake pad assemblies are retracted (i.e., released), and the gap between the brake pad assemblies increases substantially back to its initial position.

The one or more brake pad assemblies may be in communication with the caliper housing via a pressure plate. The pressure plate may function to structurally support one or more friction materials of the brake pad assembly. The pressure plate may be in communication with the caliper housing to move the brake pad assembly towards the rotor, away from the rotor, or both. For example, the pressure plate may be affixed to the caliper housing so that, when the caliper housing is driven by one or more pistons, the caliper housing extends and retracts the pressure plate, thereby extending and retracting the brake pad assembly. The pressure plate may include one or more attachment points to receive one or more clips, one or more springs, other components, or a combination thereof. The pressure plate may include one or more openings to interface with one or more abutment features (e.g., one or more guide pins) of the brake assembly. The pressure plate may include one or more ears protruding from a peripheral edge, surface, or both of the pressure plate. The one or more openings, the one or more ears, or both may interface with one or more abutment features of the brake assembly to guide the one or more brake pad assemblies during movement and contact the rotor with the friction material. The pressure plate may have a shape substantially similar to one or more friction materials, or may be dissimilar.

One or more friction materials may be disposed on, and joined to, a surface of the pressure plate. The friction materials may function to provide a clamping force on a rotor of the brake system. For example, the one or more friction materials may be disposed on a surface of the pressure plate so that the one or more friction materials are positioned between the pressure plate and the rotor, thereby allowing the one or more friction materials to contact the rotor. The one or more friction materials may be adhered, mechanically fastened, or both to the pressure plate. The one or more friction materials may be integrally formed with the pressure plate. A plurality of pressure plates may support a single friction material, or a plurality of friction materials may be supported by a single pressure plate. The friction material, the pressure plate, or both may be engaged by one or more shims.

The shim may function to bias the brake pad assemblies to prevent vibration and unwanted moving of the brake pad assemblies during braking operations. The shim may be positioned between the brake pad assemblies and the caliper housing, support bracket, or both. The shim may prevent noise, such as squeaking or squealing, resulting from rattling of the brake pad assemblies. The shim may have a shape substantially similar to the friction material, the pressure plate, or both. The shim may be made from one or more metals, polymers, or both. The shim may be made from one or more materials configured to pad the brake pad assemblies during operation. For example, the shim may be a rubber pad positioned between the brake pad assemblies and the caliper housing. The shim may be adhesively secured to the brake pad assemblies, caliper housing, support bracket, or a combination thereof. The shim may be secured to the brake pad assemblies, caliper housing, support bracket, or a combination thereof via one or more fasteners, such as a bolt, screw, pin, clip, or a combination thereof. The shim may be used in conjunction with one or more pad clips.

The pad clip may function to communicate between the friction material, the pressure plates, or both and one or more additional components of the brake assembly. The pad clip may function to communicate between the brake pad assembly and a corresponding portion of the caliper housing, or vice versa. The pad clip may be placed between the brake pad assembly and the caliper housing to maintain communication within the abutment interface (i.e., the interface between the abutment feature and the caliper housing). The pad clip may have one or more legs, one or more arms, or both. The pad clip may include a bridge extending between the one or more legs, one or more arms, or both. The pad clip may substantially conform to the shape of the abutment feature so that the pad clip attaches to the abutment feature. For example, the pad clip may be substantially shaped like an ear of the pressure plate so that the pad clip attaches to the ear, and the assembly of the pad clip and the ear are inserted into a channel of the caliper housing to guide the brake pad assembly during application and retraction. The pad clip may include one or more angles, one or more contoured portions, one or more projections, or a combination thereof. The pad clip may be used in conjunction with one or more top clips, one or more retraction springs, or both. The pad clip may be placed between the brake pad assembly and one or more additional components of the brake assembly, such as a support bracket that supports the brake pad assembly. The pad clip may be used in conjunction with one or more pad springs.

The one or more pad springs may function to aid in release of one or more brake pad assemblies from a clamping position. The pad springs may be secured to the one or more brake pad assemblies. The pad springs may provide a biasing force on the one or more brake pad assemblies. For example, the pad springs may provide a biasing force on the one or more brake pad assemblies in a direction substantially opposing a clamping direction of the one or more brake pad assemblies to aid in retraction of the one or more brake pad assemblies. The pad springs may have one or more elastic portions, one or more inelastic portions, or both. The pad springs may be elastically deformed so that, after deformation, the pad springs may substantially return to an original position, original shape, or both. The pad springs may secure to a pressure plate of the brake pad assemblies.

The brake assembly may include a support bracket. The support bracket may function to support one or more components of the brake assembly. The support bracket may function to align the caliper housing to one or more brake pad assemblies, a rotor, or both. The support bracket may support one or more brake pad assemblies, the caliper housing, or a combination thereof. The support bracket may be aligned with the caliper housing via one or more guide pins so that opposing brake pad assemblies are also aligned. The support bracket may extend around all or a portion of the rotor. The support bracket may include one or more cavities to receive one or more guide pins. The cavities may be any size and shape to receive the one or more guide pins. The cavities may extend through a portion of the support bracket or an entire thickness of the support bracket. The cavities may have a length greater than a length of a portion of the guide pin being received so that the guide pin may freely move within the cavity. The guide pins may move freely within the cavity via a force exerted by one or more pistons.

The piston may function to drive one or more brake pad assemblies. The piston may contact a pressure plate of the brake pad assembly to drive the friction material towards the rotor. The piston may be housed within the caliper housing. Alternatively, the piston may be housed within a separate piston housing abutting the caliper housing. The piston may hydraulically actuated, electromechanically actuated, or both. The piston may be any size and shape to drive the one or more brake pad assemblies. The piston may be a plurality of pistons to drive one or more brake pad assemblies. The piston may drive a brake pad assembly secured to the caliper housing so that the caliper housing moves relative to an opposing support bracket via one or more guide pins secured to the caliper housing and movably received by the support bracket.

The guide pin assembly may function to secure, align, or both a guide pin relative to the caliper housing, the support bracket, or both. The guide pin assembly may be configured to mount the guide pin to the caliper housing and extend the guide pin into a cavity of the support bracket so that the caliper housing movably opposes the support bracket, or vice versa. As such, a brake pad assembly of the caliper housing may move relative to a brake pad assembly of the support bracket to provide a clamping force on a rotor positioned between the brake pad assemblies. The guide pin assembly may include a sleeve, a guide pin, or both. The guide pin assembly may be configured to ensure proper alignment of the caliper housing relative to the support bracket to prevent lockup caused by misalignment during operation of the brake assembly. For example, a sleeve of the of the guide pin assembly may receive a guide pin and position the guide pin relative to the caliper housing, the support bracket, or both.

The sleeve may function to secure a guide pin within a hole of the caliper housing, the support bracket, or both. The sleeve may receive a portion of the guide pin to position the guide pin relative to the caliper housing, the support bracket, or both. The sleeve may be positioned in a hole of the caliper housing, the support bracket, or both prior to insertion of the guide pin. Alternatively, the sleeve may be secured to the guide pin and the guide pin assembly (i.e., the guide pin and the sleeve) may be mounted in the brake assembly. The sleeve may have an interior channel that is shaped to receive the guide pin. For example, the guide pin may be substantially cylindrical in shape and the sleeve may include a cylindrical channel that receives the guide pin. The sleeve may fixedly secure the guide pin in a desired position. For example, the sleeve may include an internal threading that mates to a threading of the guide pin so that the guide pin remains in a desired position during operation of the brake assembly. Alternatively, the sleeve may be free of an internal threading and secure the guide pin via a press-fit condition. The sleeve may be any size and shape configured to be secured in a hole of the caliper housing, the support bracket, or both. The sleeve may be any size and shape configured to receive the guide pin. The sleeve may be compressible, flexible, or rigid. The sleeve may have a portion that is compressible while having another portion that is structurally rigid. The sleeve may include an internal hole that extends between opposing ends of the sleeve so that the guide pin may extend through the sleeve. The internal hole may include a friction modifier, such as a lubricant, to aid in movement of the guide pin in the hole. A single sleeve may secure a guide pin or a plurality of sleeves may secure a single guide pin.

The sleeve may include a flange. The flange may function to abut a surface of the caliper housing, the support bracket, or both when the sleeve is inserted into a hole of the caliper housing, the support bracket, or both. The flange may function to aid in securing the sleeve in the caliper housing, the support bracket, or both. The flange may have a diameter greater than the diameter of the remaining sleeve. For example, the flange of the sleeve may have a diameter that is about 25% larger or more, about 50% or more, or about 75% or more. The flange of the sleeve may have a diameter that is about 150% or less, about 125% or less, or about 100% or less. The flange may be received in a cutout portion of the caliper housing, the support bracket, or both so that a surface of the flange is substantially coplanar with a surface of the caliper housing, the support bracket, or both after insertion of the sleeve into a hole of the caliper housing, the support bracket, or both.

The flange may include a protruding surface. The protruding surface may function to abut a surface of the caliper housing, the support bracket, or both when the sleeve is inserted into a hole of the caliper housing, the support bracket, or both. The protruding surface surround an internal hole of the sleeve. For example, the protruding surface may be substantially circular so that the protruding surface encircles an opening of the hole of the sleeve. The protruding surface may be positioned anywhere along a surface of the flange. The protruding surface may be considered any undulation or contour on a surface of the flange. The protruding surface may be integrally formed with the sleeve. The protruding surface may include an abrasive surface to increase friction between the flange and the caliper housing, the support bracket, or both. The protruding surface may be configured to maintain a position of the sleeve relative to the support bracket, the caliper housing, or both in conjunction with one or more flat edges of the sleeve.

The flat edges of the sleeves may function to prevent rotation of the sleeve relative to the caliper housing, the support bracket, or both. For example, the flange may be received in a cutout of the caliper housing after the sleeve is inserted into a hole of the caliper housing, the support bracket, or both that is shaped substantially similar to the flange to prevent rotation. The flat edges may be located anywhere along an outer edge of the flange. The flat edges may be a chamfered surface. The flat edges may be a flat cutout of the outer peripheral edge of the flange. The flat edges may be a pair of opposing flat edges located on opposing sides of the sleeve. The flat edges may form any angle with the peripheral edge shape of the flange.

The sleeve may also include a groove. The groove may function to receive and secure a boot configured to enclose a portion of the guide pin. The groove may be located along a body of the sleeve so that the boot may be extended over the sleeve and received by the groove. The groove may be any size and shape configured to receive the boot. The groove may be integrally formed with the sleeve. The groove may include a lip having a diameter greater than the groove to create a friction fit with the boot. The groove may be positioned anywhere axially along the sleeve to receive the boot during assembly, after assembly, or both. For example, the groove may extend from a flange of the sleeve so that the boot, once secured to the sleeve, abuts an end face of the flange.

Additionally, the guide pin may include a groove. The groove may function to receive and secure a boot configured to enclose a portion of the guide pin. The groove may be similar to the groove of the sleeve or may be different. The groove may be located along a shaft portion of the guide pin so that the boot may be extended over the guide pin and received by the groove. The groove may be any size and shape configured to receive the boot. The groove may be integrally formed with the guide pin. The guide pin and the sleeve may both include a groove. Alternatively, the pin may include a groove and the sleeve may be free of a groove, or vice versa. The groove may be positioned anywhere axially along the sleeve to receive the boot during assembly, after assembly, or both. For example, the groove may be positioned along the shaft portion of the guide pin so that, after the guide pin is inserted into the sleeve, the groove remains exposed to secure the boot.

The boot may function to protect the guide pin during application. The boot may encompass a portion of the guide pin during a braking application, during a release application, before application, after application, or a combination thereof. The boot may be positioned around a portion of the guide pin exposed during movement so that debris, moisture, or both are substantially prevented from contacting the guide pin. The boot may protect a shaft portion of the guide pin. The boot may protect about 15% or more of the guide pin, about 30% or more of the guide pin, or about 45% or more of the guide pin. The boot may protect about 90% or less of the guide pin, about 75% or less of the guide pin, or about 60% or less of the guide pin. The boot may be secured to a groove of the guide pin, a groove of the sleeve, or both. The boot may be compressible so that, as the guide pin extends into a cavity of the support bracket, the boot compresses and remains between a surface face of the cavity and the sleeve. The boot may be elastic so that, as the guide pin extends out of the cavity of the support bracket, the boot may elastically extend to encompass the guide pin.

The guide pin may function to slidably connect the caliper housing to the support bracket. The guide pin may function to movably secure one or more opposing brake pads of the brake assembly. The guide pin may be fixedly secured to the caliper housing and movably secured to the support bracket, or vice versa. For example, the guide pin may be secured in a hole of the caliper housing via the sleeve and extend into a cavity of the support bracket so that the caliper housing may axially move relative to the support bracket, or vice versa. The guide pin may include a head portion, a shaft portion, an engaging portion, or a combination thereof. The guide pin may be structurally rigid. For example, the guide pin may be structurally rigid to support a weight of the support bracket, the caliper housing, or both. The guide pin may be any desired size and shape. The guide pin may be configured to mate with the sleeve. For example, the guide pin may include an engaging portion that is received by a hole of the sleeve.

The engaging portion may function to secure the guide pin to the sleeve, the caliper housing, the support bracket, or a combination thereof. The engaging portion may be positioned anywhere along the guide pin. For example, the engaging portion may abut a head portion of the guide pin so that, when the engaging portion is received by a hole of the sleeve, the sleeve abuts the head portion. The engaging portion may include one or more engaging features to secure the guide pin to the sleeve, the caliper housing, the support bracket, or a combination thereof. For example, the engaging portion may include one or more threads the mate to one or more internal threads of the sleeve. Alternatively, the engaging portion may be substantially smooth and create a press-fit condition when inserted into a hole of the sleeve. The engaging portion may be configured to permanently secure the guide pin to the sleeve, the caliper housing, the support bracket, or a combination thereof (i.e., the guide pin may be damaged, destroyed, or both during removal). The engaging portion may be configured to removably secure the guide pin to the sleeve, the caliper housing, the support bracket, or a combination thereof so that the guide pin may be removed from the caliper housing, the support bracket, or a combination thereof free of damage. The engaging portion may include one or more adhesives to bond the guide pin to the sleeve, the caliper housing, the support bracket, or a combination thereof. The engaging portion may abut the shaft of the guide pin. The engaging portion and the shaft may a substantially uniform shape or may be different. For example, the engaging portion may have a diameter greater than a diameter of the shaft so that the shaft may extend through the sleeve prior to mating to the engaging portion.

The engaging portion may be located along a shaft portion of the guide pin. The shaft portion may function to movably connect the guide pin to the caliper housing, the support bracket, or both. The shaft portion may function to fixedly secure the guide pin to the caliper housing, the support bracket, the sleeve, or a combination thereof. For example, the shaft portion may include an engaging portion to fixedly secure the guide pin to the sleeve and also include a shaft the movably secures the guide pin to the support bracket. The shaft portion may include the engaging portion, a shaft, or both. The shaft portion may abut a head portion of the guide pin. The shaft portion may be configured to at least partially extend through a hole of the sleeve, a hole of the caliper housing, or a hole of the support bracket, or a combination thereof.

The shaft portion may include a shaft. The shaft may function to movably engage the guide pin to the support bracket, the caliper housing, or both. The shaft may be received by a cavity of the support bracket, the caliper housing, or both. The shaft may be any size and shape to be received by the support bracket, the caliper housing, or both. The shaft may have a length substantially similar to a length of the cavity of the support bracket, the caliper housing, or both. Alternatively, the shaft may have a length less than a length of the cavity of the support bracket, the caliper housing, or both so that the shaft may freely extend into the cavity (i.e., the shaft does not bottom out by abutting an end of the cavity). The shaft may be substantially uniform and extend along an axis of the guide pin so that the shaft may extend into the cavity of the support bracket, the caliper housing, or both. The shaft may include a friction modifier along an exterior surface so decrease friction between the shaft and the cavity. The friction modifier may be a lubricant, grease, oil, graphite powder, silicone, or a combination thereof. The shaft may be free of a friction modifier.

The shaft may include one or more notches. The notches may function to reduce suction between the shaft and the cavity. The notches may extend along a length of the shaft. the notches may extend along an entire length of the shaft or only a portion of the shaft. For example, the notches may extend along about 15% or more of the shaft, about 30% or more of the shaft, or about 45% or more of the shaft. The notches may extend along about 90% or less of the shaft, about 75% or less of the shaft, or about 60% or less of the shaft. The notches may extend from a distal end of the shaft. The notches may be integrally formed with the shaft. For example, the notches may be a chamfered surface along the shaft or a cutout portion of the shaft. The notches may include a channel to allow fluid movement when the shaft is inserted into the cavity. The notches may be any size and shape that reduces suction between the shaft and the cavity. The notches may reduce suction by about 15% or more, about 30% or more, or about 45% or more. The notches may reduce suction by about 90% or less, about 75% or less, or about 60% or less. The notches may be positioned along a first end portion of the guide pin that opposes a head portion.

The head portion of the guide pin may function to determine a position of the guide pin during assembly, after assembly, or both. The head portion may be configured to abut one or more surfaces of the sleeve, the caliper housing, the support bracket, or a combination thereof and prevent movement in a desired direction. For example, the head portion may about a surface of a hole of the caliper housing after the shaft of the guide pin has been inserted through the hole. The head portion may include a head of the guide pin. The head portion may include a flange. The flange may abut a surface of the support bracket, the sleeve, the caliper housing, or a combination thereof. The flange may have a diameter that is greater than a hole of the sleeve, the caliper housing, the support bracket, or a combination thereof so that the flange prevents further insertion of the guide pin into the hole. The head portion may be integrally formed with the guide pin. The head portion may abut the shaft portion of the guide pin. For example, the head portion may abut the engaging portion of the guide pin.

The head portion may include a head. The head may function to allow a user to install the guide pin in the caliper housing, the sleeve, the support bracket, or a combination thereof. The head may be configured to drive the guide pin into the caliper housing, the support bracket, or a combination thereof. For example, the head portion may be shaped so that a user may screw the guide pin into the sleeve using a socket. The head portion may be shaped substantially like a shape of a bolt so that a user may install the guide pin using one or more tools. The head portion may be a full-bearing shape, square shape, hexagonal, slotted, countersunk, round, pan shaped, or a combination thereof. The head portion may be configured to receive a screwdriver head (e.g., Philips, flathead, or both), a socket wrench, a hex key wrench, or a combination thereof. The head may be structurally rigid to prevent shearing of the guide pin during torque application. For example, the guide pin may be structurally rigid to allow the guide pin to be screwed into an internal threading of the sleeve.

The head may abut a flange. The flange may function to abut a surface of the caliper housing, the support bracket, the sleeve, or a combination thereof when the guide pin is inserted into a hole of the caliper housing, the support bracket, the sleeve, or a combination thereof. The flange may function to aid in securing the guide pin in the caliper housing, the support bracket, the sleeve, or a combination thereof. The flange may have a diameter greater than the diameter of the remaining guide pin. For example, the flange may have a diameter that is about 25% larger or more, about 50% or more, or about 75% or more relative to the guide pin. The flange may have a diameter that is about 150% or less, about 125% or less, or about 100% or less relative to the guide pin. The flange may be received in a cutout portion of the caliper housing, the support bracket, or both so that a surface of the flange is substantially coplanar with a surface of the caliper housing, the support bracket, or both after insertion of the guide pin into a hole of the caliper housing, the support bracket, the sleeve, or a combination thereof.

Turning now to the figures, FIG. 1 illustrates a perspective view of a brake assembly 20. The brake assembly 20 includes a pair of opposing brake pad assemblies 23 housed within a caliper housing 22. The caliper housing 22 includes a plurality of fasteners 72 to secure sections of the caliper housing 22 to each other. The caliper housing 22 is supported by a plurality of guide pin assemblies 50 secured to the caliper housing 22 and slidably engaged to a support bracket 30 located within the caliper housing 22 (see FIG. 7). Each brake pad assembly 23 includes a friction material 26 disposed on a pressure plate 24 and aligned via a shim 28. The brake pad assemblies 23 oppose one another so that, as a piston 40 engages a first brake pad assembly 23A, the first brake pad assembly 23A moves towards a rotor (not shown). Once the first brake pad assembly 23A engages the rotor, the caliper housing 22 slides along the plurality of guide pin assemblies 50 so that a second brake pad assembly 23B pushed by the caliper housing 22 moves toward an opposing side of the rotor, thereby providing a clamping force on the rotor between the brake pad assemblies 23. As the piston 40 releases engagement of the first brake pad assembly 23A, the first brake pad assembly 23A moves back towards its original starting position and is aided in retraction by a pad clip 34 (see FIG. 7). The brake pad assemblies 23 are secured within the support bracket 30. The brake pad assemblies 23 are configured to slide within the support bracket 30 while the caliper housing 22 moves via the plurality of guide pin assemblies 50 secured to the caliper housing 22 and extending into the support bracket 30. Each guide pin assembly 50 also extends through a boot 32 positioned between the caliper housing 22 and the support bracket 30. Additionally, the piston 40 is located within the caliper housing 22.

Figure 2:
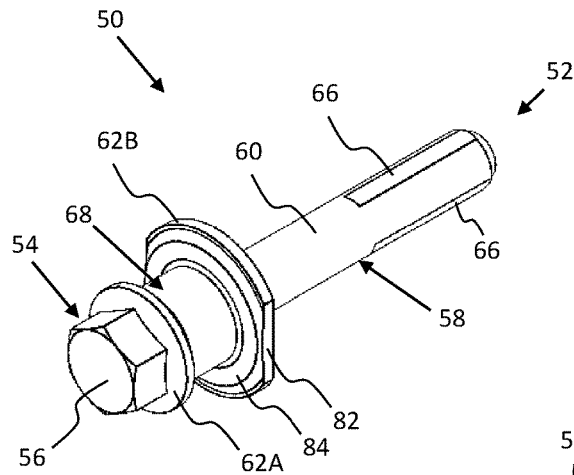
FIG. 2 is a perspective view of a guide pin assembly having a guide pin and a sleeve.
Figure 3:
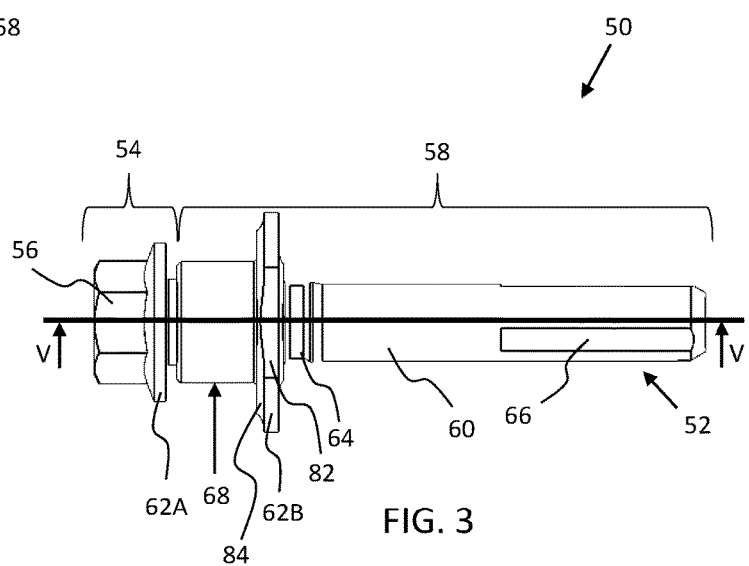
FIG. 3 is a side view of a guide pin assembly having a guide pin and a sleeve.

FIG. 2 illustrates a perspective view of a guide pin assembly 50. The guide pin assembly 50 includes a guide pin 52 extending through a hole of a sleeve 68. The guide pin 52 includes a head portion 54 integrally formed with a shaft portion 58. The head portion 54 includes a head 56 and a flange 62A such that the head portion 54 may abut a peripheral edge of the sleeve 68, a surface of a caliper housing, or both. The shaft portion 58 includes a shaft 60 having a plurality of notches 66. The sleeve 68 also includes a flange 62B such that the sleeve 68 may be inserted into a hole of the caliper housing and a protruding surface 84 of the flange 62B may abut a surface of the caliper housing (see FIGS. 1 and 5). The sleeve 68 also includes a plurality of flat edges 82 to prevent rotation of the sleeve 68 during assembly, FIG. 3 illustrates a side view of a guide pin assembly 50. The guide pin assembly 50 includes a guide pin 52 extending through a hole of a sleeve 68. The guide pin 52 includes a head portion 54 integrally formed with a shaft portion 58. The head portion 54 includes a head 56 and a flange 62A such that the head portion 54 may abut a peripheral edge of the sleeve 68, a surface of a caliper housing, or both. The shaft portion 58 includes a shaft 60 having a plurality of notches 66. The shaft 60 also includes a groove 64 that receives a portion of a boot positioned between the caliper housing and a support bracket (see FIGS. 1 and 5). The sleeve 68 also includes a flange 62B such that the sleeve 68 may be inserted into a hole of the caliper housing and a protruding surface 84 of the flange 62B may abut a surface of the caliper housing. The sleeve 68 also includes a plurality of flat edges 82 to prevent rotation of the sleeve 68 during assembly.

Figure 4:
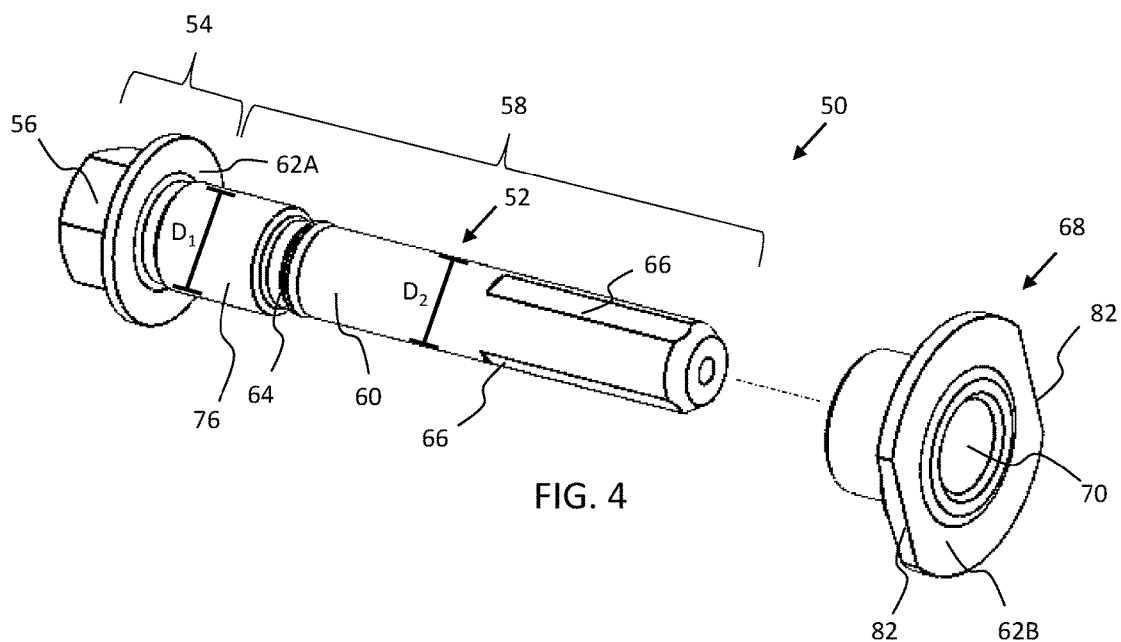
FIG. 4 is an exploded perspective view of a guide pin assembly having a guide pin and a sleeve.

FIG. 4 illustrates an exploded perspective view of a guide pin assembly 50. The guide pin assembly 50 includes a guide pin 52 configured to extend through a hole 70 of a sleeve 68. The guide pin 52 includes a head portion 54 integrally formed with a shaft portion 58. The head portion 54 includes a head 56 and a flange 62A such that the head portion 54 may abut a peripheral edge of the sleeve 68, a surface of a caliper housing, or both. The shaft portion 58 includes a shaft 60 that is integrally formed and cantilevered from an engaging portion 76, and the shaft includes a plurality of notches 66 and a groove 64. The engaging portion 76 may engage an inner surface of the sleeve 68 once inserted into the hole 70 of the sleeve 68 (e.g., the engaging portion 76 may be threaded to mate with an internal threading of the sleeve 68; see FIG. 5). The engaging portion 76 may have a diameter ($D_1$) greater than a diameter ($D_2$) of the shaft 60. The groove 64 may receive a portion of a boot positioned between the caliper housing and a support bracket (see FIGS. 1 and 5). The sleeve 68 includes a flange 62B such that the sleeve 68 may be inserted into a hole of the caliper housing and a protruding surface of the flange 62B may abut a surface of the caliper housing (see FIGS. 2 and 3). The sleeve 68 also includes a plurality of flat edges 82 to prevent rotation of the sleeve 68 during assembly.

Figure 5:
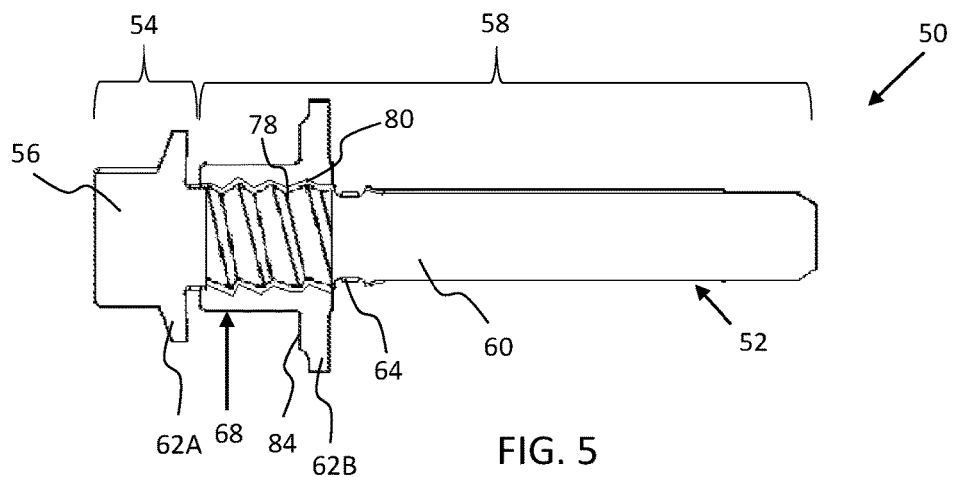
FIG. 5 is cross-sectional view V-V of FIG. 3.

FIG. 5 illustrates cross-sectional view V-V of the guide pin assembly 50 of FIG. 3. The guide pin assembly 50 includes a guide pin 52 extending through a hole of a sleeve 68. A plurality of threads 78 of the guide pin 52 engage a plurality of internal threads 80 of the sleeve. The guide pin 52 includes a head portion 54 integrally formed with a shaft portion 58. The head portion 54 includes a head 56 and a flange 62A such that the head portion 54 may abut a peripheral edge of the sleeve 68, a surface of a caliper housing, or both. The shaft portion 58 includes a shaft 60 having a plurality of notches and a groove 64 that receives a portion of a boot positioned between the caliper housing and a support bracket (see FIGS. 1 and 5). The sleeve 68 includes a flange 62B such that the sleeve 68 may be inserted into a hole of the caliper housing and a protruding surface 84 of the flange 62B may abut a surface of the caliper housing (see FIGS. 2 and 3).

Figure 6:
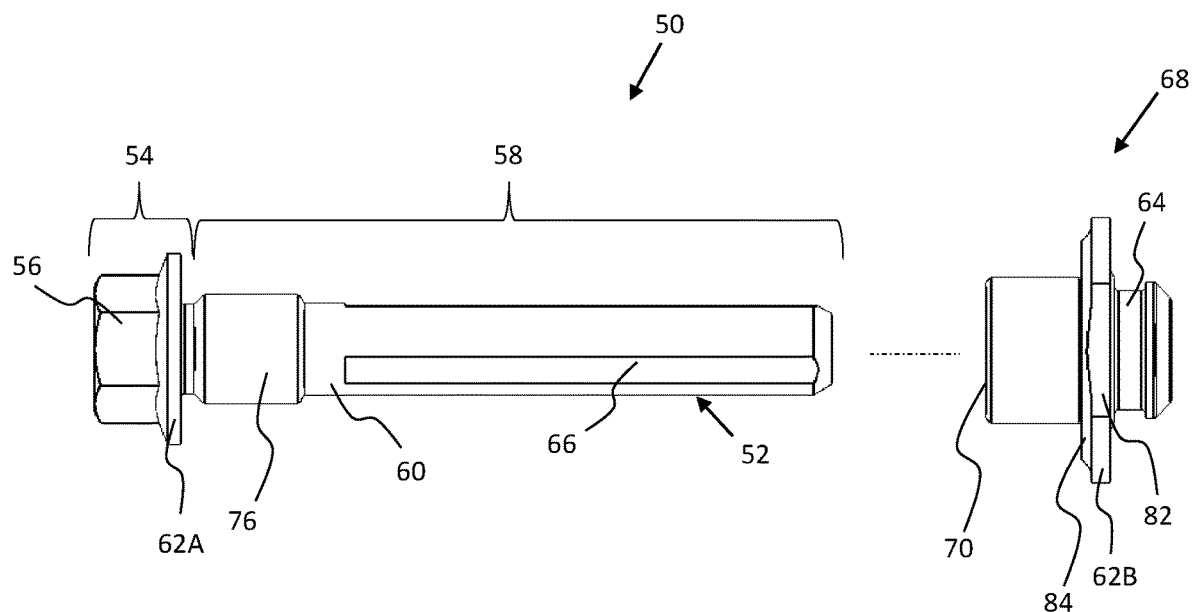
FIG. 6 is an exploded side view of a guide pin assembly having a guide pin and a sleeve.

FIG. 6 illustrates an exploded side view of a guide pin assembly 50. The guide pin assembly 50 includes a guide pin 52 configured to extend through a hole 70 of a sleeve 68. The guide pin 52 includes a head portion 54 integrally formed with a shaft portion 58. The head portion 54 includes a head 56 and a flange 62A such that the head portion 54 may abut a peripheral edge of the sleeve 68, a surface of a caliper housing, or both. The shaft portion 58 includes a shaft 60 that is integrally formed and cantilevered from an engaging portion 76, and the shaft includes a plurality of notches 66. The engaging portion 76 may engage an inner surface of the sleeve 68 once inserted into the hole 70 of the sleeve 68 (e.g., the engaging portion 76 may be threaded to mate with an internal threading of the sleeve 68; see FIG. 5). The sleeve 68 includes a flange 62B such that the sleeve 68 may be inserted into a hole of the caliper housing and a protruding surface 84 of the flange 62B may abut a surface of the caliper housing (see FIGS. 2 and 3). The sleeve also includes a plurality of flat edges 82 to prevent rotation of the sleeve 68 during assembly and a groove 64 of the sleeve 68 may receive a portion of a boot positioned between the caliper housing and a support bracket (see FIGS. 1 and 5).

Figure 7:
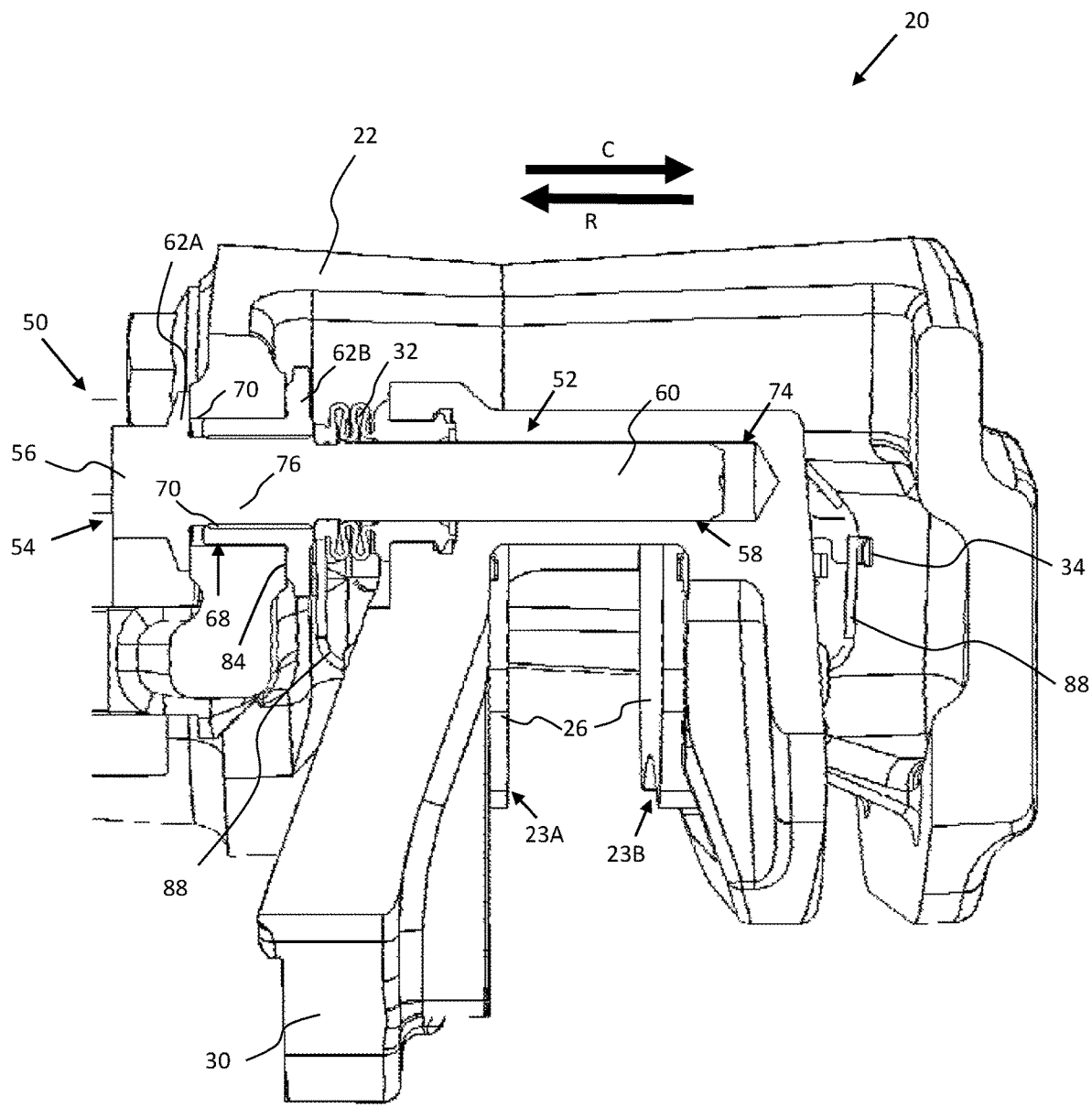
FIG. 7 is cross-sectional view VI-VI of FIG. 1.

FIG. 7 illustrates cross-sectional view VI-VI of the brake assembly 20 of FIG. 1. The brake assembly 20 includes a pair of opposing brake pad assemblies 23 housed within a caliper housing 22. The caliper housing 22 is supported by a plurality of guide pin assemblies 50 slidably engaged to a support bracket 30 located within the caliper housing 22. Each brake pad assembly 23 includes a friction material 26 disposed on a pressure plate and aligned via a shim, a pad clip 34, or both (see FIG. 1). The brake pad assemblies 23 oppose one another so that, as a piston engages a first brake pad assembly 23A, the first brake pad assembly 23A moves towards a rotor (not shown) in a clamping direction (C). Once the first brake pad assembly 23A engages the rotor, the caliper housing 22 slides along the plurality of guide pin assemblies 50 so that a second brake pad assembly 23B pushed by the caliper housing 22 moves toward an opposing side of the rotor, thereby providing a clamping force on the rotor between the brake pad assemblies 23. As the piston releases engagement of the first brake pad assembly 23A, the brake pad assemblies 23 move back toward their original starting position in a release position (R) via a plurality of pad springs 88. The brake pad assemblies 23 are secured within the support bracket 30. The brake pad assemblies 23 are configured to slide within the support bracket 30. Each guide pin assembly 50 extends through a boot 32 positioned between the caliper housing 22 and the support bracket 30. Each guide pin assembly 50 includes a guide pin 52 extending through a hole 70 of a sleeve 68 into a cavity 74 of the support bracket 30. The guide pin 52 includes a head portion 54 integrally formed with a shaft portion 58. The head portion 54 includes a head 56 and a flange 62A such that the head portion 54 may abut a peripheral edge of the sleeve 68, a surface of the caliper housing 22, or both. The shaft portion 58 includes a shaft 60 that extends into the cavity 74 of the support bracket 30. The shaft portion 58 also includes an engaging portion 76 that may engage an inner surface of the sleeve 68 once inserted into the hole 70 of the sleeve 68 (e.g., the engaging portion 76 may be threaded to mate with an internal threading of the sleeve 68). The sleeve 68 also includes a flange 62B such that the sleeve 68 may be inserted into a hole 70 of the caliper housing 22 and the flange 62B of the sleeve 68 may abut a surface of the caliper housing 22.

ELEMENT LIST

20 Brake Assembly
22 Caliper Housing
23 Brake Pad Assembly
23A First Brake Pad Assembly
23B Second Brake Pad Assembly
24 Pressure Plate
26 Friction Material
28 Shim
30 Support Bracket
32 Boot
34 Pad Clip
40 Piston
50 Guide Pin Assembly
52 Guide Pin
54 Head Portion
56 Head
58 Shaft Portion
60 Shaft
62 Flange
62A Guide Pin Flange
62B Sleeve Flange
64 Groove
66 Notch
68 Sleeve
70 Hole
72 Fastener
74 Cavity
76 Engaging Portion
78 Thread
80 Internal Thread
82 Flat Edge
84 Protruding Surface
88 Pad Spring
R Release Direction (of First Brake Pad Assembly)
C Clamping Direction (of First Brake Pad Assembly)
D1 Diameter of Engaging Portion
D2 Diameter of Shaft The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps.

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The disclosures of all articles and references, including patent applications and publications, are incorporated by reference for all purposes. Other combinations are also possible as will be gleaned from the following claims, which are also hereby incorporated by reference into this written description.

Unless otherwise stated, a teaching with the term "about" or "approximately" in combination with a numerical amount encompasses a teaching of the recited amount, as well as approximations of that recited amount. By way of example, a teaching of "about 100" encompasses a teaching of within a range of 100+/−15.

What is claimed is:

1. A guide pin assembly, comprising:
   a. a sleeve; and
   b. a guide pin comprising:
      i. a head portion; and
      ii. a shaft portion integrally formed with the head portion and extending through a hole of the sleeve, wherein an engaging portion of the shaft portion engages an internal surface of the sleeve, and the sleeve and the guide pin are substantially coaxial;
   wherein the guide pin assembly is configured to be inserted in a borehole of a brake caliper; and
   wherein a shaft of the shaft portion extending from the engaging portion is inserted into a cavity of a support bracket, and a caliper housing and the guide pin assembly are moved relative to the support bracket along an axis of the shaft.

2. A brake caliper comprising:
   a. a support bracket;
   b. a caliper housing, the caliper housing being movably engaged to the support bracket; and
   c. a first brake pad assembly and an opposing second brake pad assembly positioned within the caliper housing, the first and second brake pad assemblies secured to the support bracket,
   wherein the first and second brake pad assemblies are movably engaged to each other via one or more guide pin assemblies according to claim 1 that are fixedly secured to the caliper housing and extend into one or more cavities of the support bracket.

3. The brake caliper according to claim 2, wherein the caliper housing moves in a direction substantially parallel to the one or more guide pin assemblies when a piston extends into the first brake pad assembly, moving the first brake pad assembly towards the opposing second brake pad assembly.

4. The brake caliper according to claim 2, wherein the one or more cavities of the support bracket and the one or more guide pin assemblies are coaxial.

5. The guide pin assembly according to claim 1, wherein the engaging portion includes one or more threads that engage one or more internal threads of the sleeve.

6. The guide pin assembly according to claim 1, wherein a diameter of the engaging portion is greater than a diameter of the shaft of the shaft portion.

7. The guide pin assembly according to claim 1, wherein the sleeve is configured to be inserted in the borehole of the brake caliper by mating an external surface of the sleeve with an internal surface of the borehole.

8. The guide pin assembly according to claim 1, wherein the shaft portion includes a groove to secure a boot to the shaft portion, and the groove, the boot, or both are positioned between the caliper housing and the support bracket.

9. The guide pin assembly according to claim 1, wherein the head portion includes a flange that is configured to abut a surface of the caliper housing, a peripheral edge of the sleeve, or both so that the shaft portion extends a desired length through and away from the borehole.

10. The guide pin assembly according to claim 1, wherein a flange of the sleeve is configured to abut a surface of the caliper housing when the sleeve is inserted into a hole of the caliper housing.

11. The guide pin assembly according to claim 1, wherein the shaft portion includes one or more notches configured to allow for insertion of the shaft into the cavity of the support bracket.

12. The guide pin assembly according to claim 1, wherein the sleeve comprises:
   i. a flange; and
   ii. a channel portion integrally formed with the flange, the channel portion having an internal surface and an external surface; and
   wherein the sleeve is inserted into the cavity of the caliper housing and the flange abuts a surface of the caliper housing.

13. A guide pin assembly comprising:
   a. a sleeve having a flange;
   b. a guide pin comprising:
      i. a shaft portion; and
      ii. a head portion integrally formed with the shaft portion, the head portion having a flange near an end connecting the head portion and the shaft portion,
   wherein the flange of the head portion of the guide pin abuts a peripheral edge of the sleeve and an external surface of the shaft portion engages an internal surface of the sleeve;
   wherein the guide pin assembly is configured to be inserted in a brake caliper; and
   wherein a shaft of the shaft portion is inserted into a cavity of a support bracket, and a caliper housing and the guide pin assembly are moved relative to the support bracket along an axis of the shaft.

14. The guide pin assembly according to claim 13, wherein the flange of the sleeve and the flange of the guide pin are substantially parallel.

15. The guide pin assembly according to claim 13, wherein a portion of the external surface of the shaft portion of the guide pin is threaded and engages the internal surface of the sleeve.

16. The guide pin assembly according to claim 15, wherein the threaded portion has a diameter greater than a remaining portion of the shaft portion.

17. The guide pin assembly according to claim 13, wherein the sleeve and the guide pin are substantially coaxial.

18. A method comprising:
   a. inserting the sleeve of one of the guide pin assemblies according to claim 1 into a hole of the caliper housing until a flange of the sleeve abuts an inner surface of the caliper housing;
   b. inserting the shaft portion of the guide pin into the hole of the sleeve so that the shaft portion extends through a boot positioned between the inner surface of the caliper housing and the support bracket, and further extends into a cavity of the support bracket; and
   c. engaging the engaging portion of the shaft portion with the internal surface of the sleeve to fixedly secure the guide pin with the sleeve,
   wherein a flange of the guide pin abuts an outer surface of the caliper housing after engagement; and
   wherein the caliper housing and the guide pin assembly are moved relative to the support bracket along an axis of the shaft.

19. The method according to claim 18, wherein, after engagement, a flange of the head portion of the guide pin abuts an outer surface of the caliper housing, a peripheral edge of the sleeve, or both.

20. The method according to claim 18, wherein the cavity of the support bracket and the guide pin are substantially coaxial.

* * * * *